US 6,576,126 B1

(12) United States Patent
Kobayashi

(10) Patent No.: US 6,576,126 B1
(45) Date of Patent: Jun. 10, 2003

(54) DEVICE FOR MAGNETICALLY MODIFYING FLUID

(75) Inventor: Teruo Kobayashi, Hokkaido (JP)

(73) Assignee: Kabushiki Kaisha Rei Hart, Tokyo (JP); part interest ( * ) Notice: Subject to any disclaimer, the term of this patent is extended or adjusted under 35 U.S.C. 154(b) by 0 days.

(21) Appl. No.: 09/914,597

(22) PCT Filed: May 17, 2000

(86) PCT No.: PCT/JP00/03150
§ 371 (c)(1),
(2), (4) Date: Aug. 30, 2001

(87) PCT Pub. No.: WO00/71470
PCT Pub. Date: Nov. 30, 2000

(30) Foreign Application Priority Data

May 19, 1999 (JP) .............................. 11-138602

(51) Int. Cl.[7] ............................................. B01D 35/06
(52) U.S. Cl. ................... 210/222; 210/232; 422/186.01
(58) Field of Search ..................... 210/222, 232, 210/695; 422/186.01

(56) References Cited

U.S. PATENT DOCUMENTS 4,605,498 A * 8/1986 Kulish ........................ 210/222
4,711,271 A * 12/1987 Weisenbarger et al. ..... 210/222
4,933,151 A * 6/1990 Song ..................... 422/186.01

FOREIGN PATENT DOCUMENTS

| JP | 6-1232 | 1/1994 |
| JP | 9-314150 | 9/1997 |
| JP | 3050236 | 4/1998 |
| JP | 2804458 | 7/1998 |
| JP | 11-251659 | 9/1999 |

OTHER PUBLICATIONS

International Search Report.

* cited by examiner

Primary Examiner—David A. Reifsnyder
(74) Attorney, Agent, or Firm—RatnerPrestia

(57) ABSTRACT

An apparatus for magnetically modifying fluid, capable of uniformly forming high magnetic field over the interior of a pipe through which the fluid passes, to activate the fluid with a high efficiency. A ring-like magnetic block (13) includes a ring-like core (15) of magnetic material and a pair of ring-like magnets (14, 14) disposed on opposite sides of the core, and fitted over a pipe (11) extending through a casing (19), fluid flowing through said pipe, each of said magnets having on its one side the north pole and on its other side the south pole, the south poles of the magnets in pair being oriented opposite to each other, and a P-type semiconductor on the inner peripheral surface of said ring-like core.

4 Claims, 4 Drawing Sheets

DEVICE FOR MAGNETICALLY MODIFYING FLUID

FIELD OF THE INVENTION

This invention relates to an apparatus for magnetically modifying fluid and more particularly, to such an apparatus for magnetically modifying fluid passing through a pipe.

BACKGROUND OF THE INVENTION

It has been known for a long time that magnetic fields are applied to water passing through a pipe to break the bonds of the molecular of water, thereby activating their motion, and this makes the water tasty. It has been found and defined by many physicists for a long time that the south and north poles of a magnet have positive and negative electric charges, respectively and the south pole is effective in modification of properties of weak fluidic magnetic material.

An example of an invention created on the basis of such a theory includes Japanese Patent 2,804,458. This patent discloses an apparatus for magnetizing water wherein as shown in FIG. 7 of the accompanying drawings, magnets 2 and 3 are disposed along the length of a pipe 1 on its opposite sides, the south and north poles of the magnets being oriented opposite to each other so that the magnetic lines of force are generated perpendicularly to a direction of flow of water through the pipe 11.

Another example is Japanese Utility Model Publication Hei 6-1232 which discloses an apparatus for modification of fluidic material comprising a barrel 1 of magnetic material, a block 4 including annular magnets 2 and annular pole pieces 3 of magnetic material arranged alternatively and disposed within the barrel 1, the same poles of the two adjacent magnets being oriented opposite to each other, and a fastening means for retaining the block 4 in it's assembled relation. The block 4 also includes a plurality of legs 5 of non-magnetic material and projecting from the periphery thereof for abutting the inner wall of the barrel 1 to define a passage 6 around the block 4 and between it and the barrel 1. Closed magnetic circuits are formed from the annular magnets through ones of the annular pole pieces 3, and the barrel 1 to the other adjacent annular pole pieces 3 to define magnetic paths across the fluid passage.

In the arrangement as shown in FIG. 7, the magnetic field id formed horizontally rather than over the entire interior of the pipe 11. For this reason, the activation of water is effected with a low efficiency. In the arrangement as shown in FIG. 8, troublesome assembly is required because the block 4 includes many components and the plurality of legs 5 are acquired to support the block 4 within the barrel 1. In addition, the apparatus is of a weak construction incapable of resisting shock from the exterior.

A main object of the invention is to provide an apparatus for magnetically modifying fluid, capable of forming high magnetic field over the entire interior of the pipe through which the fluid flows, and efficiently activating the fluid.

Another object of the invention is to provide such an apparatus having simpler construction and which is easy to assembly and is strong enough to resist any shock from the exterior.

SUMMARY OF THE INVENTION

These objects can be achieved by providing an apparatus comprising a ring-like magnetic block including a ring-like core of magnetic material and a pair of ring-like magnets disposed on opposite sides of the core, and fitted over a pipe extending through a casing, fluid flowing through the pipe, each of the magnets having on its one side the north pole and on its other side the south pole, the south poles of the magnets in pair being oriented opposite to each other, and a P-type semiconductor on the inner peripheral surface of the ring-like core.

With this arrangement, as weak fluidic magnetic material such as water passes through the interior (magnetic field) of the magnets, induced electricity occurs (according to the Faradic law) and this induction phenomenon is amplified by the ring-like magnetic block so that many positive charges can be supplied to the magnetic field. In addition, high magnetic field can uniformly be formed over the interior of the pipe extending through the ring-like magnetic block.

A N-type semiconductor is provided on the inner peripheral surface of the casing in which the ring-like magnetic block is contained. This functions to absorb the N-pole magnetic field which is not required for modification of water. The ring-like core serve to prevent demagnetization of the magnets and may be of a different thickness to enlarge a range of electric field (Lorentz electric field). From these reasons.

The casing containing the ring-like magnetic block is filled with weak magnetic oil such as vegetable oil, animal oil, CH oil or mixture of these oils. Thus, the apparatus is unlikely to be affected by magnetic action from the exterior. Thus, stabilization of the magnetic field is achieved and in addition, any oxidation of the ring-like magnets 14 and the casing 19 can be prevented.

THE BEST MODE FOR CARRYING OUT THE INVENTION

Figure 1:
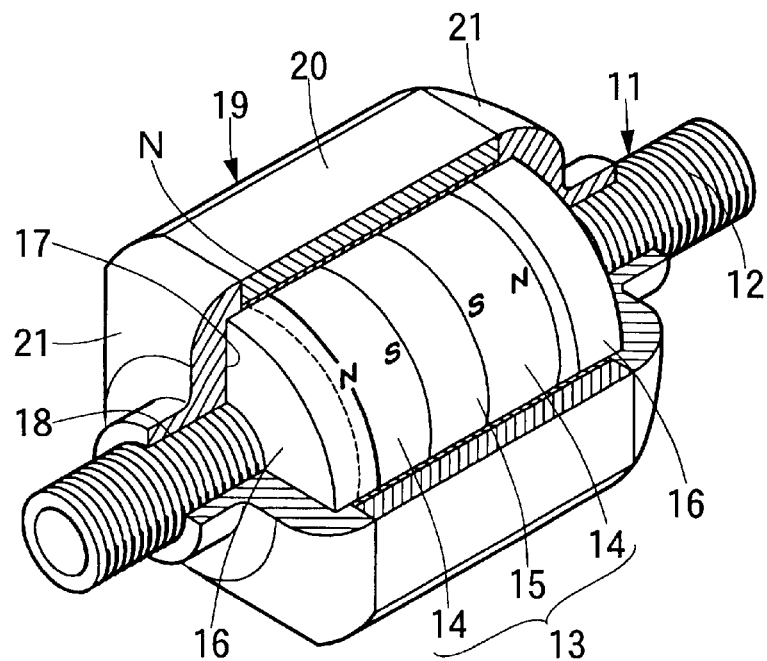
FIG. 1 is a perspective view of the apparatus according to the present invention and partially cut away.
Figure 2:
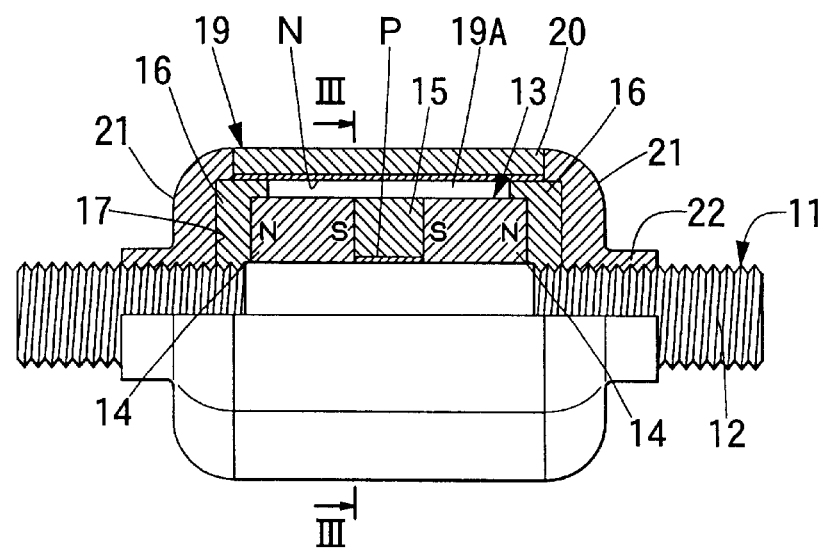
FIG. 2 is a side view of the apparatus shown in FIG. 1 but partially cut away.
Figure 3:
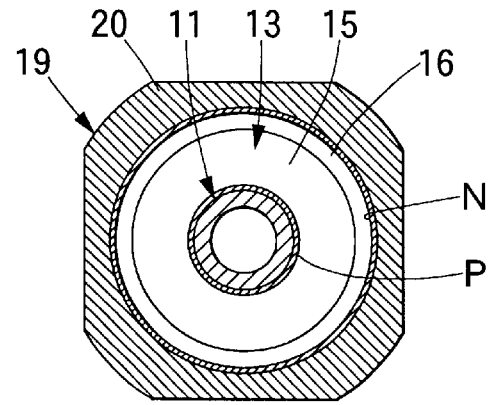
FIG. 3 is a view in section of the apparatus taken along line 3—3 of FIG. 2.
Figure 4:
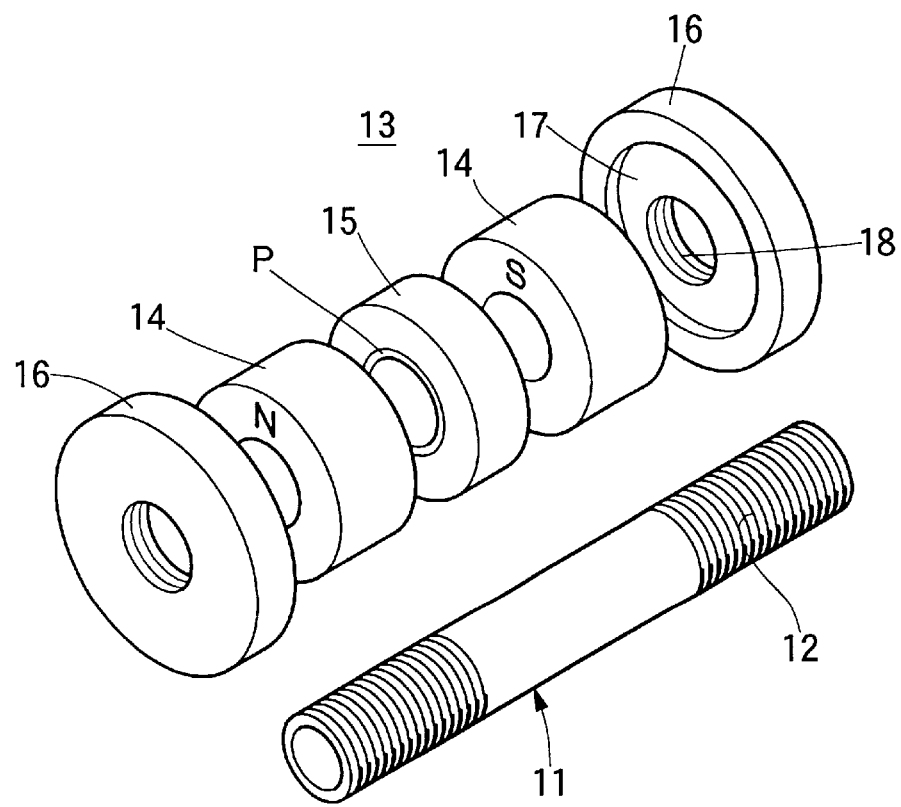
FIG. 4 is a perspective view of the pipe and magnetic block of the apparatus exploded.

Referring to FIGS. 1 to 5 of the accompanying drawings, there is shown therein an apparatus for magnetically modifying fluid, constructed in accordance with an embodiment of the invention.

In the several views, reference numeral 11 indicates a length of pipe through which fluid such as service water flows. External threads 12,12 are formed on the periphery of the pipe 11 at its opposite ends. A magnetic block 13 is mounted on the pipe 11 and comprises a pair of spaced apart ring-like magnets 14 and 14, and a ring-like core 15 of magnetic material interposed between the ring-like magnets 14 and 14. There are provided retainers 16 and 16 for retaining the ring-like magnets 14,14 and the ring-like core 15 on the pipe 11 in an abutment relation.

The ring-like magnets 14 and 14 in pair have on their opposite faces the south poles and on their other faces the north poles. Each of the ring-like magnets 14, 14 and the ring-like core 15 includes a bore having an inner diameter substantially equal to an outer diameter of the pipe 11. The ring-like magnets 14,14 and the ring-like core 15 also have substantially the same outer diameter. Each of the retainers 16 and 16 has a larger outer diameter than that of each of the ring-like magnets 14,14 retainer and is provided with a circular recess 17 formed on the inward face thereof, in which each of the ring-like magnets 14,14 is fitted. Internal threads 18 are formed on the inner wall of a bore of each of the retainers 16,16 to engage the external threads 12 on the pipe 11.

There is provided a casing 9 including a barrel 20 of magnetic material, and a pair of end caps 21, 21 positioned at the opposite ends of the barrel 20. The barrel 20 has an inner diameter slightly larger than the outer diameter of the retainers 16,16. Each of the end caps 21,21 has internal threads 22 formed on the inner wall of a bore therein to engage the external threads 12 on the pipe 11.

In assembly of the components as described above, the magnetic block 13 is provided by arranging the pair of ring-like magnets 14,14 such that their south poles are in a face to face relation, and interposing the ring-like core 15 between the ring-like magnets 14 and 14. The pipe 11 is then inserted into bores of the magnets 14 and the core 15 of the magnetic block 13.

Each of the retainers 16, 16 is then threaded onto one of the opposite ends of the pipe 11 to retain on the later the ring-like magnets 14, 14 and the ring-like core 15 interposed therebetween. Inserted into the barrel 20 is the magnetic block 3 retained on the pipe 11 by the retainers 16, 16. The end caps 21,21 are threaded onto the threaded ends of the pipe 11 until they abut the end faces of the barrel 20 to sealingly containing the magnetic block 13 within the casing 19.

Figure 5:
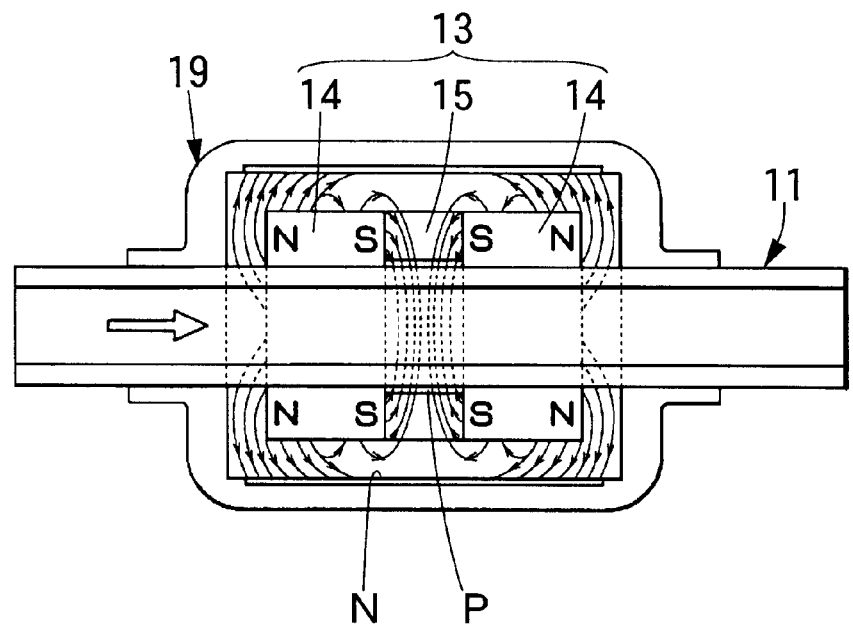
FIG. 5 is a view of generation of the magnetic lines of force from the apparatus.

As shown in FIG. 5, magnetic lines of force are generated between the south poles and the north poles of the pair of ring-like magnets 14, 14 through the pipe 11 to excite the molecular of water flowing through the pipe 11 for activation thereof. The ring-like core 15 which may be of a predetermined thickness and interposed between the ring-like magnets 14 and 14, serves to reduce the self-demagnetizing force so that the magnetic lines of force act on the water. In addition, the magnetic lines of force also remove rust, scale or the like which would be deposited on the inner wall of the pipe 11. The ring-like core 15 having a different thickness may be employed to enlarge a range of the Lorentz electric field in addition to preventing the demagnetizing force of the ring-like magnets 14 and 14.

A P-type semiconductor P is provided on the inner peripheral surface of the bore of the ring-like core 15 while a N-type semiconductor N is provided on the inner peripheral surface of the barrel 20 of the casing 19. The P-type semiconductor P causes a larger amount of the positive electric charge to be supplied into the magnetic field, thereby amplifying phenomenon of excitation of water. In addition, this results in generation of high uniform magnetic field through the pile 11 to make it possible to significantly improve the activation of the water molecular.

It has been known that by adding a extremely small quantity of impurities in a semiconductor, its electric conductivity highly varies and therefore, can be controlled by changing the quantity of the impurities within a range of 5 to 10 figures. There are two types of semiconductor formed depending upon kinds of impurities, a N-type semiconductor wherein electron with negative charge carries electric current and a P-type semiconductor wherein holes with positive charge carries electric current. Typical examples of the semiconductor include silicon, germanium, gallium, and arsenic.

N-type semiconductor N functions to absorb N-pole magnetic field which is not required for modification of the water, to obtain a high quality of water. The apparatus constructed in accordance with the present invention has, over a long distance, an ability to activate the water molecular, thereby modifying the water. The casing 19 may be filled with weak magnetic oil such as vegetable oil, animal oil, CH oil or mixture of these oils so that the magnetic field of the ring-like magnets 14 apparatus is not affected by magnetic action from the exterior. Thus, stabilization of the magnetic field 14 is achieved and in addition, any oxidation of the ring-like magnets 14 and the casing 19 can be prevented.

Figure 6:
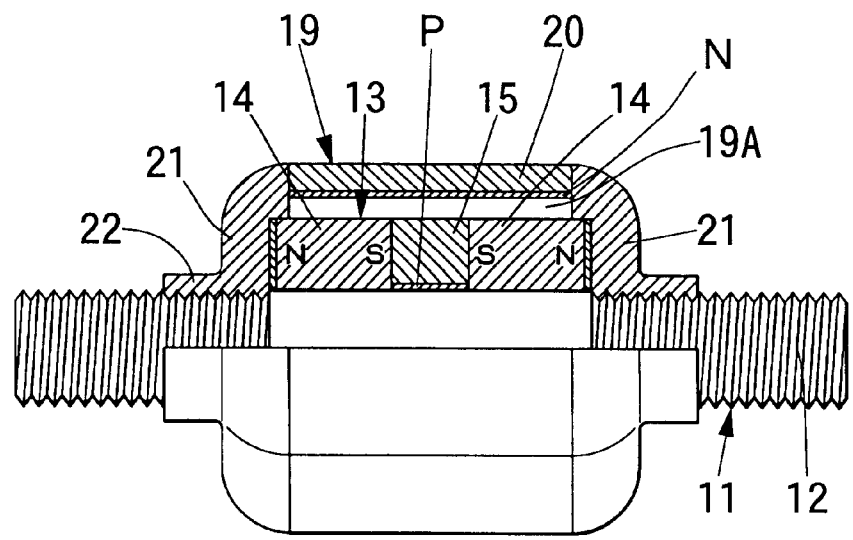
FIG. 6 is a side view of another embodiment of the apparatus but partially cut away.
Figure 7:
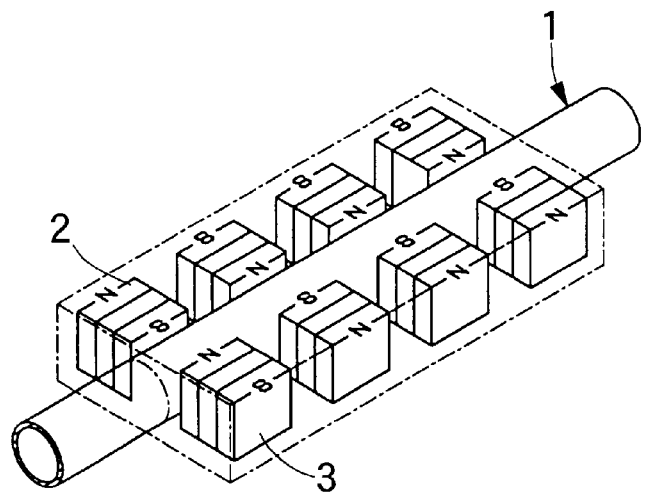
FIG. 7 is a perspective view of a prior art apparatus for magnetizing water.
Figure 8:
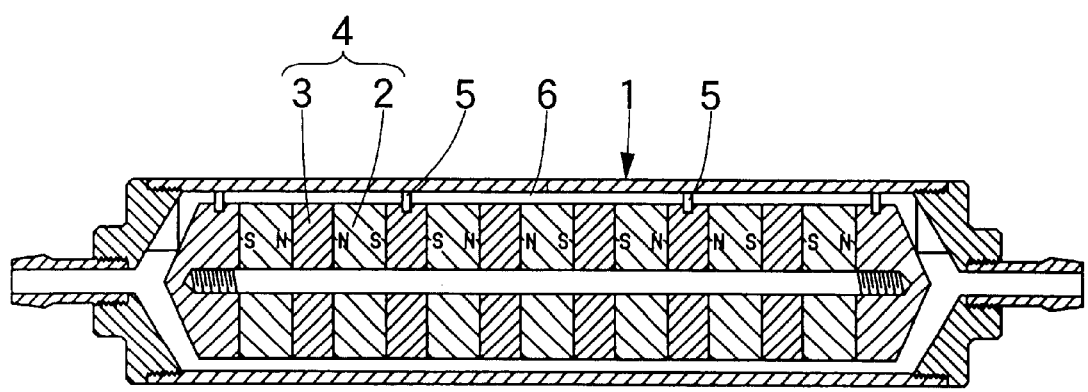
FIG. 8 is a view in section of another prior art apparatus for modifying fluid.

FIG. 6 illustrates another embodiment of the apparatus according to the invention, which is substantially the same construction as the first embodiment with the exception that any retainers are not used.

INDUSTRIAL APPLICABILITY OF THE INVENTION

The apparatus for magnetically modifying fluid according to the invention is useful as apparatus for activating liquid such as service water and suitable for use in some circumstance being subject to magnetic effect from the exterior.

What is claimed is:

1. An apparatus comprising a ring-like magnetic block including a ring-like core of magnetic material and a pair of ring-like magnets disposed on opposite sides of the core, and fitted over a pipe extending through a casing, fluid flowing through said pipe, each of said magnets having on its one side the north pole and on its other side the south pole, the south poles of the magnets in pair being oriented opposite to each other, and a P-type semiconductor on the inner peripheral surface of said ring-like core.

2. An apparatus according to claim 1, wherein a N-type semiconductor is provided on the inner peripheral surface of said casing.

3. An apparatus according to claim 2, wherein the casing is filled with weak magnetic oil.

4. An apparatus according to claim 1, wherein the casing is filled with weak magnetic oil.

* * * * *